Aug. 16, 1938.   E. A. CORBIN, JR   2,126,738
MOLDING MACHINE
Filed June 18, 1936   5 Sheets-Sheet 1
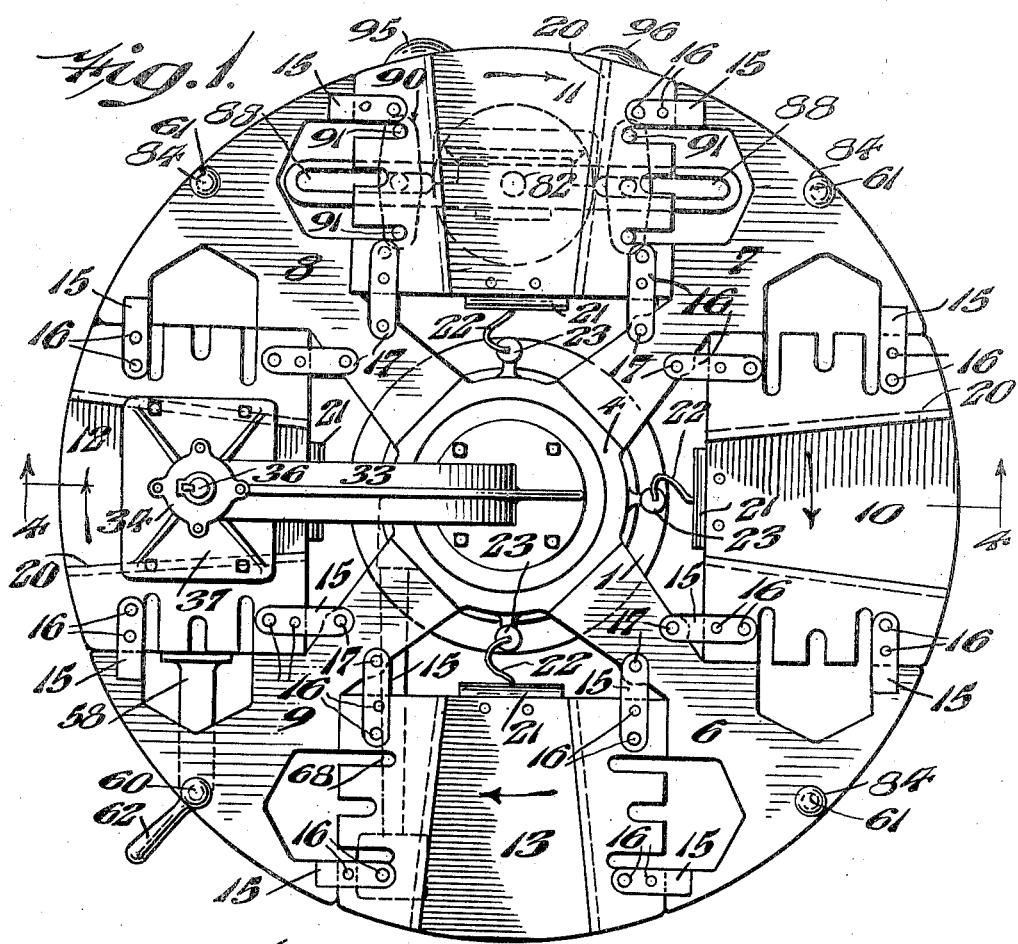
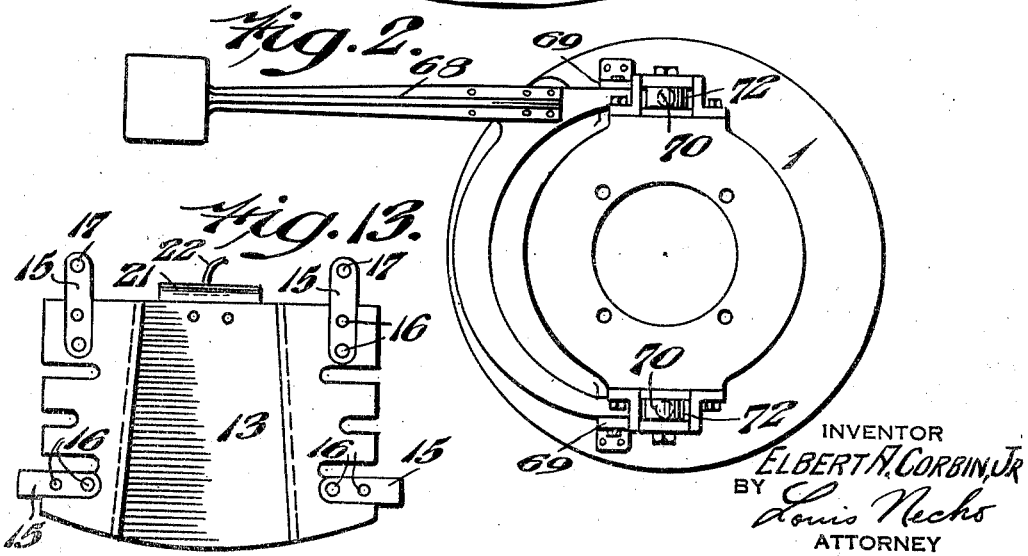
INVENTOR
ELBERT A. CORBIN, JR
BY Louis Nechs
ATTORNEY

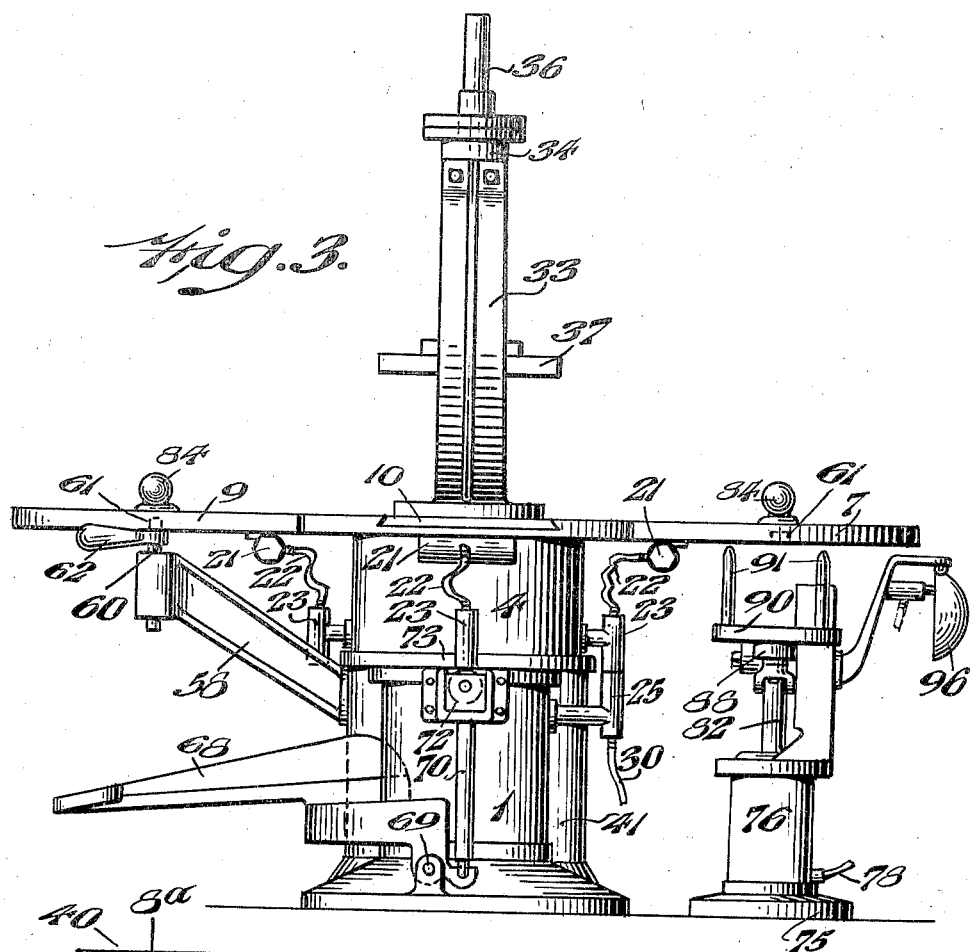
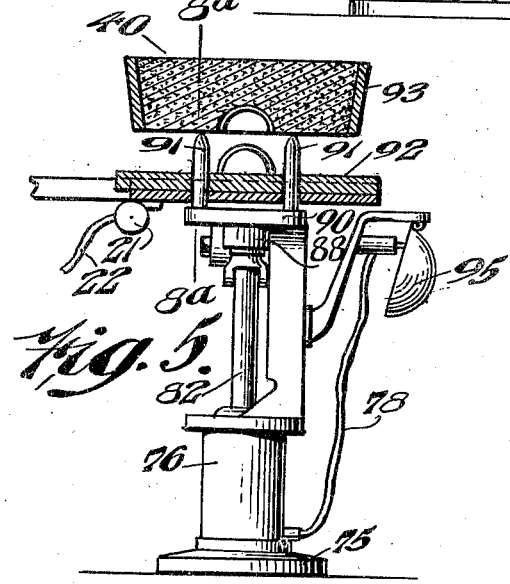
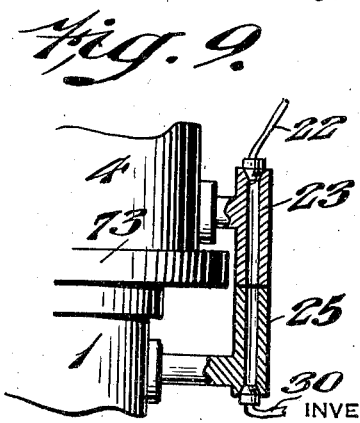

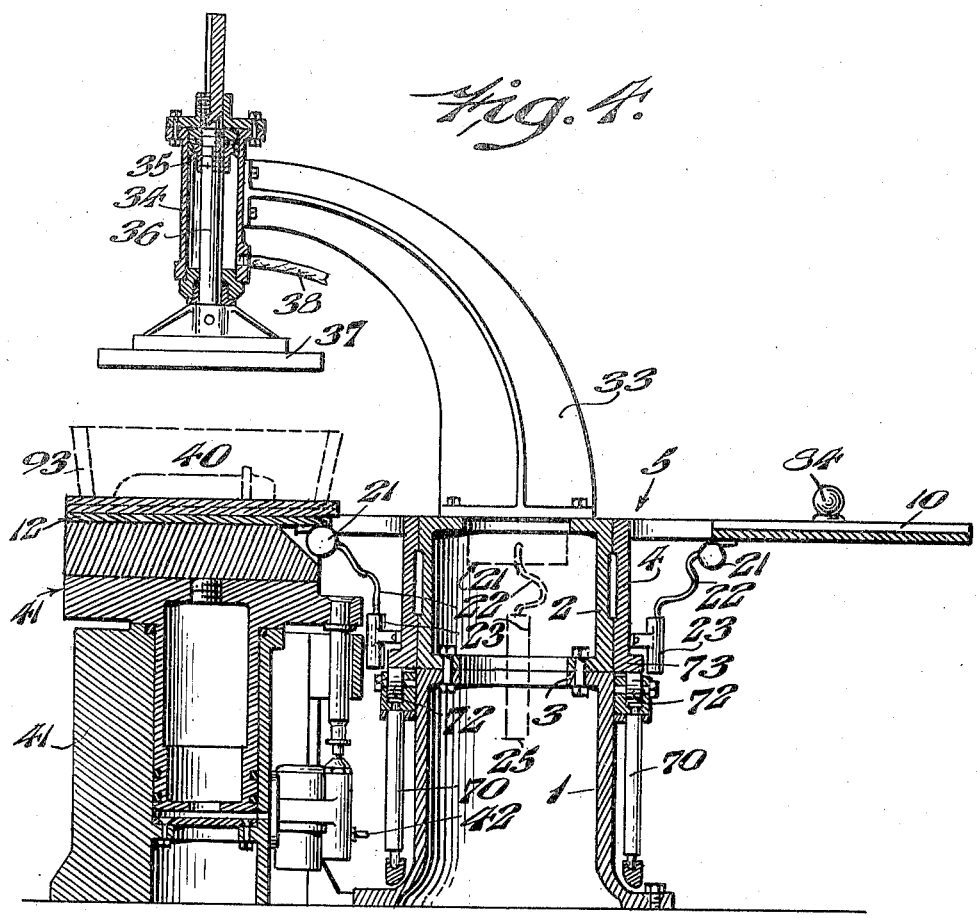

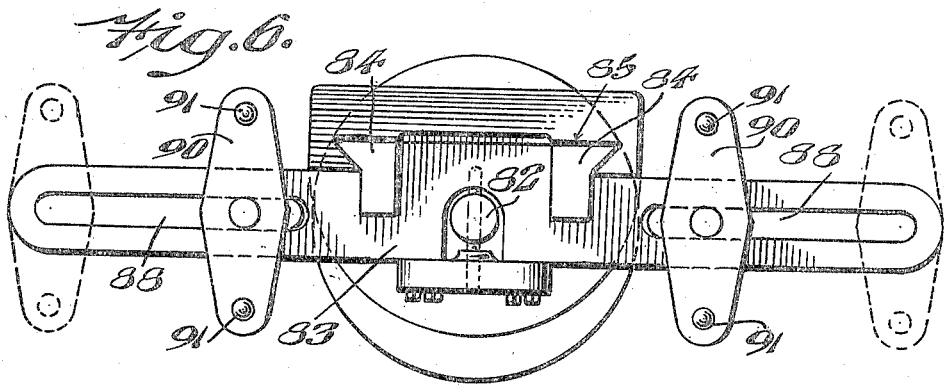
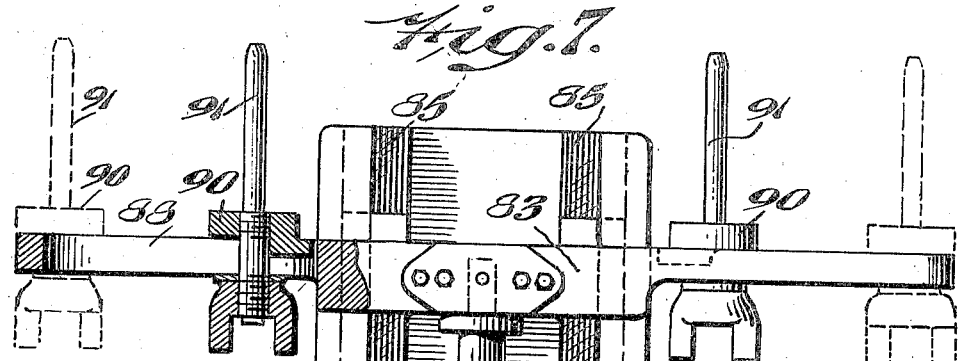
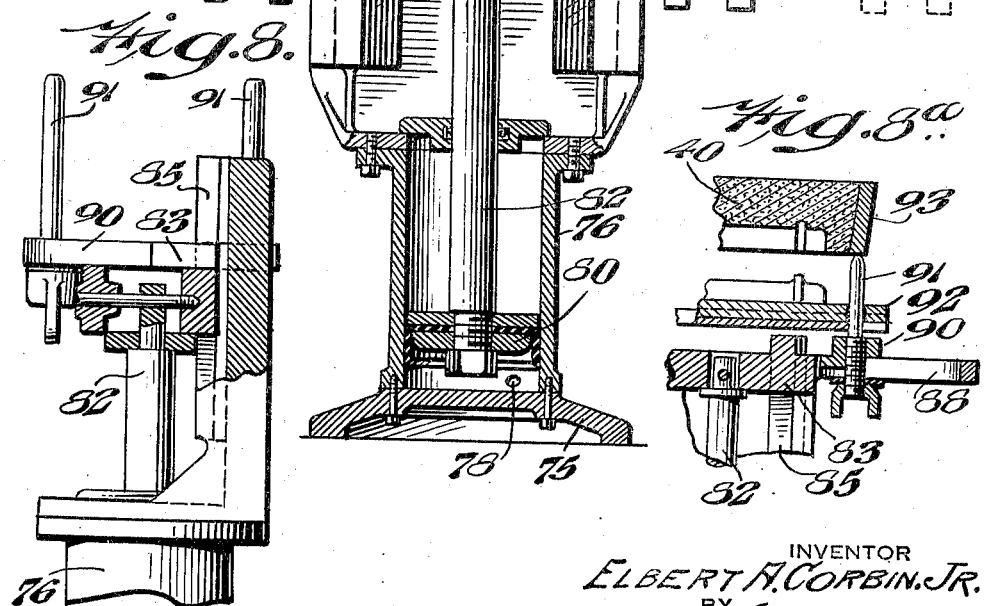

Aug. 16, 1938.                E. A. CORBIN, JR                2,126,738
                              MOLDING MACHINE
                           Filed June 18, 1936           5 Sheets-Sheet 5

INVENTOR
ELBERT A. CORBIN, JR.
BY
Louis Necks
ATTORNEY

Patented Aug. 16, 1938

2,126,738

UNITED STATES PATENT OFFICE 2,126,738

MOLDING MACHINE

Elbert A. Corbin, Jr., Lenni, Pa., assignor of one-half to William C. Biddle, Lansdowne, Pa.

Application June 18, 1936, Serial No. 85,855

6 Claims. (Cl. 22—21)

My invention relates to a new and useful molding machine and it relates more particularly to an automatic machine of a circular nature in its structure and in its operation whereby the preparation of molds is conducted in a step by step continuous manner thus greatly increasing the speed and efficiency of the machine.

My invention relates to the type of molding machine generally disclosed in prior application Serial No. 702,275, the present construction being an improvement of the disclosure of said prior application whereby a more practical and efficient molding machine is produced and one in which both the time and amount of human labor involved are greatly diminished.

My invention still further relates to a molding machine of this character the table top of which is formed of fixed connecting sections and mold supporting, detachable and movable sections which are free to reciprocate independently of the fixed sections during the jar-ramming of the mold to prevent any damage or injury to the other parts of the machine due to the violent jerking incidental to said jar-ramming operation.

My invention still further relates to a molding machine embodying novel means for the dispensation of the compressed air which serves as the actuating medium, whereby compressed air is effectively delivered from a stationary supply to the rotating working parts without the necessity for elaborate packing or other expensive and cumbersome construction, the entire operation of my molding machine being controlled by valves conveniently placed for easy access by the operators of the machine.

My invention further relates to a novel molding machine including a compressed air-operated stripper for stripping the flask from the pattern thus, not only dispensing with the otherwise manual labor involved, but also effecting the stripping more expeditiously and effectively and eliminating damage to the finished sand mold which otherwise normally results from the faltering or inaccuracy of manipulation incident to manual operation.

My invention further relates to other novel features of construction and advantages all as will be seen from the annexed specification and the accompanying drawings in which—

Fig. 1 represents a plan view of an automatic molding machine embodying my invention.

Fig. 2 represents a plan view of the base and actuating structure with the table top of the machine and its adjuncts removed.

Fig. 3 represents a right hand elevation of Fig. 1.

Fig. 4 represents a view, partly in section and partly in elevation, taken on line 4—4 of Fig. 1.

Fig. 5 represents a fragmentary view, partly in elevation and partly in section, showing details of construction and operation of the stripper mechanism shown at the right hand end of Fig. 3, the same being shown in its raised or operative position.

Fig. 6 represents a plan view of the stripper shown in Fig. 5 with the flask removed.

Fig. 7 represents a view, partly in section and partly in front elevation, of Fig. 6.

Fig. 8 represents a fragmentary view, partly in section and partly in end elevation, of the structure shown in the upper half of Fig. 7.

Fig. 8a represents a fragmentary section on line 8a—8a of Fig. 5.

Fig. 9 represents a fragmentary view of the air delivery means forming part of my invention.

Fig. 10 represents a fragmentary view, partly in elevation and partly in section, of the means for positioning and locking the table top of the molding machine at desired predetermined stations.

Fig. 13 represents a plan view of one of the mold-supporting sections forming part of the table top of the molding machine shown detached.

Figure 11:
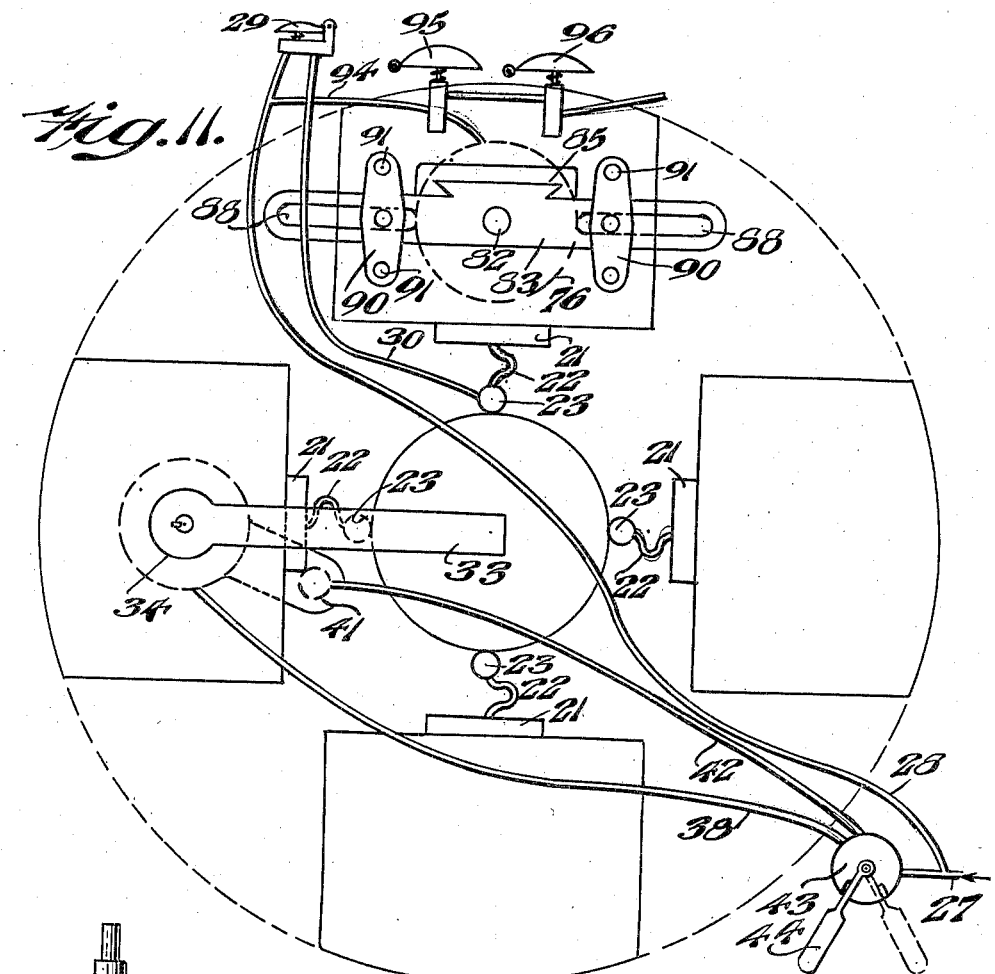
Fig. 11 represents a diagrammatic view illustrating the compressed air controls leading to the various parts of the machine.

Referring to the drawings in which like reference characters indicate like parts, and more particularly to Fig. 4, 1 designates a pedestal of any desired construction possessing the necessary strength and 2 designates a bearing hub forming part of, or suitably secured to the base 1 as at 3, and about which rotates the sleeve 4 which supports the table top 5 of the molding machine. The table top 5 is composed of the fixed arms or sections 6, 7, 8 and 9, which are integral with or rigidly secured to the sleeve 4, and which support the movable sections 10, 11, 12 and 13 through the brackets 15 which are secured to the movable sections referred to, as at 16, and which are provided with pins 17 which are adapted to engage corresponding apertures in the fixed arms 6 to 9 to integrate the movable sections 10 to 13 with the fixed sections 6 to 9 during rotation of the table top. The movable sections 10 to 13 are adapted to support pattern plates which are preferably provided with rabbeted edges to fit in the guide grooves 20. Each of the movable sections 10 to 13 is provided with a vibrator 21 to which air is supplied by the conduit 22 which, in turn, leads to the duct 23 carried by the sleeve 4, and rotatable therewith. Each of the ducts 23 is adapted to register with the stationary duct 25 by the base 1 and supplied with compressed air from the main supply 27 through the branch pipe 28 controlled by the valve 29 which controls the flow of air through the pipe 30 to the stationary duct 25.

Secured to the top of the bearing hub 2 is the arm 33 which carries the cylinder 34 in which reciprocates the piston 35 on the piston rod 36 which carries the butt-off platen 37 so that, when air is introduced through the conduit 38 into the cylinder 34, the butt-off platen 37 is raised, as shown in Fig. 4, it being understood that, when the air is exhausted from the cylinder 34, the platen 37 drops, of its own weight, upon the flask 40 resting on the jar-ramming table 41. The jar-ramming table is of the general construction shown in prior application Serial No. 702,275, and it is therefore not believed necessary to go into its operation in further detail except to point out that it is actuated by air delivered through the branch pipe 42 which, like the branch pipes 38 and 28, is supplied with air from the main supply 27. In order to minimize the number of controls I provide the multiway valve 43 having the single operated handle 44 which, by being moved from the position shown in dotted lines to that shown in solid lines, supplies compressed air to one of the pipes 38 or 42 with air and exhausts the air from the other of said pipes and vice versa. Thus, by turning the handle 44 to supply air to the jar-ramming table 41 to actuate the latter, the air is automatically exhausted from the cylinder 34 thus allowing the platen 37 to drop on the flask 40 during its vertical reciprocation. The reverse position of the handle 44 exhausts the air from the jar-ramming table 41 to stop its movement and supplies air to the cylinder 34 to raise the platen 37 out of the way. Since valves, for serving the purpose of the valve 43, are known, it is believed unnecessary to illustrate or describe its structure in full detail.

Figure 12:
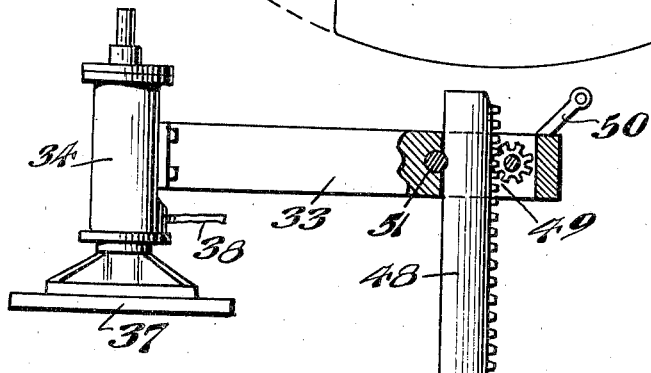
Fig. 12 represents a modified form of construction of the butt-off head best seen at the top of Fig. 4.

In Fig. 12 I have shown a modified form of butt-off head construction in which, in lieu of the curved arm 33, I provide the vertical stem 48 which is provided with a rack and pinion adjustment 49 so that, by actuation of the crank 50 and the lock 51, the arm 53 may be raised and lowered to vary the distance between the platen 37 and the top of the jar-ramming table 41 to accommodate flasks of different depths, it being understood that the structure and manner of operation of the butt-off head, shown in Fig. 12, is the same as that set forth in connection with Fig. 4.

Extending from the jar-ramming table 41 is an arm 58 which carries the spring-actuated spindle 60, the upper end of which is adapted to engage recesses 61 near the periphery of the fixed sections 6 to 9 of the table top 5 to position and lock the table in the desired registering position with respect to the jar-ramming table. The spindle 60 is depressed against the tension of its spring by the handle 62 to disengage it from said recess 61 to permit rotation of the table top 5. In order to permit of the jar-ramming of a mold without violently jerking the entire table top, not have I only provided the table top with the movable sections 10 to 13 which are separate from the stationary arms 6 to 9, but I have also raised the top of the jar-ramming table slightly above the level of the underside of the table top proper so that the section carrying the mold being jarred is free to move in a plane above the plane of the remainder of the table top. In order to raise the mold-bearing section onto the top of the jar-ramming table, I provided the pedal 68 fulcrumed at 69 and serving to raise the push rods 70 which carry the rollers 72 on which the flange 73 of the bearing hub 2 rides, as best seen in Fig. 3. This raises the table top 5 above the level of the jar-ramming table 41 whereupon the table top is manually rotated by grasping the knob 84 until the particular movable section 10 to 13 bearing the mold to be jar-rammed has registered with the top of the jar-ramming table. The pressure on the foot pedal 68 is then relieved and the push rods 70 and the entire table top 5 are lowered except for the section resting on the top of the jar-ramming table, which is now free for vertical movement independently of and without effecting the rest of the table top.

In Figs. 5 to 8a, inclusive, I have shown a stripper mechanism for stripping the jar-rammed mold from the pattern. This stripper consists of a base 75 which supports a cylinder 76 to which air is introduced through the opening 78 to act against the piston head 80 to raise the piston rod 82 which carries the arm 83 which is provided with the guide 84 which moves in the groove 85 in the dove-tailed arrangement, best seen in Fig. 6. The arm 83 is provided with adjustment slots 88 at the ends thereof in which are adjustably positioned the yokes 90 which carry the pins 91. The pins 91 are adapted to pass through apertures in the pattern plates 92 and are adjusted to register with the vertical walls 93 of the flask 40 positioned on the pattern plate so that, when compressed air is admitted to the cylinder 76 from the conduit 94 which branches off from the pipe 28 and which is controlled by the inlet and exhaust valves 95 and 96 the piston rod 82 is raised to raise the arm 83 and thus strip and raise the flask 40 from the pattern on the pattern plate 92, as best seen in Fig. 5.

The operation is as follows:

To begin operating my novel molding machine the pattern plate 92, with or without rabbeted edges to engage the grooves 20, is placed on the movable section 13. The flask 40 is then positioned on the pattern plate 92 and filled with sand. The pedal 68 is then depressed to raise the bearing hub 2 and the entire table top 5 to a point above the top of the jar-ramming table 41. The knob 84 is then grasped and the entire table top is raised until the section 13 registers with the jar-ramming table 41. In this position the registering and locking spindle 60 finds the recess 61 and is automatically engaged with said recess by its tensioning spring to lock the table top in that position. The pressure on the pedal 68 is then relieved and the bearing hub 2 with the entire table top 5 is then lowered except for the section 13 carrying the pattern plate and flask which now rests on the jar-ramming table 41. At this stage of operation the platen 37 is in its raised position and the jar-ramming table is inactive. The valve handle 44 is then moved from the position it then occupied to its other position (see Fig. 11) thus exhausting the air from the cylinder 34 and simultaneously supplying air through the conduit 42 to actuate the jar-ramming table. This causes the platen to drop on the flask 40, and the jar-ramming table to reciprocate vertically in the well known manner. The position of the valve handle 44 is now changed again to cut off the supply of air from the jar-ramming table and to feed air into the cylinder 34 to stop the movement of the jar-ramming table and to raise the platen 37 away therefrom and again into the position shown in Fig. 4. The foot pedal 68 is again depressed to raise the entire table top and engage the section 13 by means of the brackets 15 with the contiguous fixed sections 6 to 9, and the table top is again rotated until the movable section 13 assumes the position of the section 11 in Fig. 1. The valve 29 is now operated to supply air through the conduit 30 to the vibrator 21 which serves to loosen the molded sand from the pattern on the plate 92, whereupon the valve 95 is actuated to supply air to the cylinder 76 to raise the arm 83 and force the pins 91 through the apertures provided in the pattern plate 92 up against the vertical wall 93 of the flask 40 thus stripping the flask and the mold contained therein from the pattern, as best seen in Figs. 5 and 8a. The valve 96 is then operated to exhaust the air from the cylinder 76, whereupon the arm 83 drops and withdraws the pins 91 to their normal inoperative position at a point below the bottom edge of the pattern plate 92. The mold is now removed, and the table is again rotated for a new cycle of operation. The positions occupied by the movable sections 10 and 13 will be utilized for placing the pattern plate and/or the flask in position and filling them with sand, while the positions occupied by the movable sections 12 and 11 are used, respectively, for the jar-ramming and stripping operations. This insures continuous and rapid operation, in that, time is allowed during the jar-ramming and stripping operation for the preparation of other molds to be treated, it being specially noted that, while a mold section is being jarred at position 12, the rest of the table, whether it be the fixed arms 6 to 9 or the movable sections 10, 11 and 13, is entirely unaffected and undisturbed. The valves 95 and 96 have been strategically positioned in close proximity to the vibrating valve 29 and are adapted to be actuated by the knees of the operator so as to leave the hands free for manipulation of the flask to be vibrated and stripped. Similarly, a single valve 43 with a two-way position for the actuating handle 44 serves both to raise and lower the pattern 37 and actuate the jar-ramming table 41, synchronously. Attention is also called to the air supply arrangement through the movable duct 23 and the fixed duct 25 whereby each of the movable sections is supplied with air, when needed, from a single fixed point by the automatic registration of the machine during its rotation and without the necessity of connection or disconnection of conduits or the necessity of expensive packing.

Having thus described my invention, what I claim as new and desire to secure by Letters Patent is:

1. A molding machine comprising a stationary base, a rotatable top, air-actuated devices carried by said top and means for supplying compressed air to said devices comprising a fixed valve-controlled air conduit carried by said stationary base, and air conduits carried by and rotatable with said top, communicating with said devices, and adapted successively to register with said air conduit on said base to supply air to said devices.

2. A molding machine comprising a rotatable mold-supporting top, a jar-ramming table the top of which is normally slightly above the underside of said rotatable top, and means for raising said top to clear the upper edge of said jar-ramming table during the rotation of said mold-supporting top.

3. A molding machine comprising a rotatable mold-supporting top, a jar-ramming table the top of which is normally slightly above the underside of said rotatable top, and means for raising said top to clear the upper edge of said jar-ramming table during the rotation of said mold-supporting top comprising rollers supporting said rotatable top, push rods supporting said rollers and a fulcrumed lever for actuating said push rods.

4. A molding machine comprising a stationary base, a vertically slidable, rotary head associated with the upper end of said base, a table top carried by said head and adapted to support mold sections, uprights supporting said head, and means for raising and lowering said table top, comprising cams associated with the lower end of said uprights, a yoke operatively connected to said cams and an actuating lever secured to said yoke.

5. In a molding machine a central fixed base, a vertically slidable, rotary head carried by said base, a table top carried by said head and adapted to support mold sections, and a rammer carried by said central fixed base and overhanging said mold sections when the latter are in position on said table top.

6. A molding machine comprising a stationary base, a head rotatably mounted on said base, a spider carried by said head and constituting a portion of a table top, detachable legs carried by said spider constituting the remainder of said table top, said detachable sections representing stations in the operation of said molding machine, a fixed arm carried by said stationary base and overhanging said table top, a squeeze head carried by the extremity of said arm and registering with one of said stations, a jarring mechanism positioned below said squeeze head and normally slightly higher than said table top, means for elevating said table top to clear the top of said jarring table whereby one of said detachable sections and a mold section carried thereby may be deposited upon said jarring table, means for normally retaining said squeeze head in an inoperative position and for permitting said squeeze head to drop on said mold section by gravity, and means for actuating said jarring table while said squeeze head is resting on said mold section.

ELBERT A. CORBIN, Jr.